United States Patent
Chervick et al.

(10) Patent No.: US 6,402,107 B1
(45) Date of Patent: *Jun. 11, 2002

(54) MOUNTING BRACKET AND RAPTOR PERCH GUARD

(75) Inventors: Timothy M Chervick, Vernal, UT (US); Jerry D. Williams, Evanston, WY (US)

(73) Assignee: Falcon Enterprises, LLC, Evanston, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/701,404

(22) PCT Filed: Mar. 12, 1999

(86) PCT No.: PCT/US99/05403
§ 371 (c)(1),
(2), (4) Date: Nov. 28, 2000

(87) PCT Pub. No.: WO99/54759
PCT Pub. Date: Sep. 16, 1999

Related U.S. Application Data

(60) Provisional application No. 60/077,746, filed on Mar. 12, 1998, and provisional application No. 60/104,630, filed on Oct. 15, 1998.

(51) Int. Cl.⁷ .............................................. A47B 96/00
(52) U.S. Cl. ............................ 248/226.11; 248/222.14; 248/228.1; 52/101
(58) Field of Search .................... 248/226.11, 213.1, 248/214, 222.14, 228.1, 220.21, 222.11, 227.3, 227.4, 228.4, 231.51; 52/101, 40, 712, 220.7

(56) References Cited

U.S. PATENT DOCUMENTS

| | | | |
|---|---|---|---|
| 1,685,663 A | 9/1928 | Austin | |
| 1,893,702 A | 1/1933 | Glenn | |
| 2,298,194 A | 10/1942 | Caldwell | |
| 3,792,829 A | 2/1974 | Fickett | |
| 3,848,838 A | 11/1974 | Thomas | |
| 4,143,437 A | 3/1979 | Voykin | |
| 4,359,844 A | 11/1982 | Hoggard et al. | |
| 4,660,870 A | 4/1987 | Donley | |
| 4,852,840 A | 8/1989 | Marks | |
| 4,901,963 A | 2/1990 | Yoder | |
| 5,299,528 A | 4/1994 | Blankenship | |
| 5,312,081 A | 5/1994 | Martin | |
| 5,478,041 A | 12/1995 | Mayne | |
| 5,615,524 A | 4/1997 | Costa, Sr. | |
| 5,702,082 A | 12/1997 | Evans et al. | |

FOREIGN PATENT DOCUMENTS

FR    1571463    6/1969

OTHER PUBLICATIONS

Appendix C. Product Information for various perch guards.
Bird–B–Gone™ Important Specification Installation Information "Spike 2000" System; 6 pages.
Pacer Industries, Inc. "Bird or Raptor Guards" 2 page advertisement.
Kaddas Enterprises, Inc. Kone–Head anti–perch/anti–nest device; 5 page advertisement.

Primary Examiner—Ramon O. Ramirez
Assistant Examiner—A. Joseph Wujciak
(74) Attorney, Agent, or Firm—Sheridan Ross P.C.

(57) ABSTRACT

The present invention is directed towards a self-closing bracket (20) for use in mounting an object, such as a perch guard, on elevated structures, such as power lines. The self-closing bracket (20) has an upper member (24) and a lower member (28). The lower member (28) is rotatably connected to the upper member (24) and has a closure member (60) that extends into the interior of the bracket (20) when the bracket (20) is in an open position. As the bracket (20) is moved towards the object to be clamped, the lower member (28) pivots relative to the upper member (24) as the closure member (60) engages the object to be clamped, thereby urging the bracket (20) to an at least partially closed position.

20 Claims, 15 Drawing Sheets

MOUNTING BRACKET AND RAPTOR PERCH GUARD

CROSS REFERENCE TO RELATED APPLICATIONS

The present application claims priority under 35 U.S.C. §119(e) from U.S. Provisional Patent Application Serial No. 60/077,746, filed Mar. 12, 1998, and U.S. Provisional Patent Application Serial No. 60/104,630, filed Oct. 15, 1998.

FIELD OF THE INVENTION

The present invention relates generally to devices for mounting objects on structures for supporting utility lines and specifically to a bracket for mounting objects, such as a raptor perch guard, on structures for supporting power lines.

BACKGROUND OF THE INVENTION

Each year, hundreds of raptors and other large birds worldwide, many of which are endangered, are electrocuted by power lines. The birds are attracted to elevated structures supporting the power lines as locations to perch on during their search for prey. Many countries now require perch guards to be employed on power poles to discourage raptors and other large birds from landing on the poles and/or prevent them from contacting exposed power components. Such perch guard systems typically employ one or more electrically insulative structural members located on the cross-arms of the poles to obstruct access of large birds to the cross-arms.

Existing perch guard systems can have many problems. Perch guard systems can be relatively complicated and difficult to use and install. They can be relatively heavy and have numerous parts that must be interconnected by the user prior to installation on the power pole. Existing attachment systems for engaging the perch guards with the poles can be difficult and time consuming for personnel to engage with the cross-arms, especially on high power poles. Attachment systems commonly require two-handed operation and are therefore difficult to install with a hotstick. As will be appreciated, a hotstick is a long pole composed of an electrically insulating material such as fiberglass having a tool such as a socket wrench mounted on one end of the pole. Some perch guards are fiberglass and readily splinter during installation, creating a health hazard for personnel. They can require power to be shut off during installation, thereby causing power outages for customers. They can degrade rapidly outdoors due to the combination of sunlight and adverse weather conditions and require relatively frequent replacement. Finally, they can be relatively heavy and/or expensive.

SUMMARY OF THE INVENTION

It is an object of the present invention to provide a perch guard and attachment system that is lightweight and simple to use and install, do not splinter during installation, can be installed without shutting down power, have relatively long service lives in outdoor applications, are relatively inexpensive, and can be quickly and easily installed with a hotstick.

One aspect of the present invention is directed to a bracket for mounting objects on an elevated structure supporting a line for transmitting electrical energy. The bracket includes:

(a) first and second members connected by a hinge member and (b) a fastener for engaging the members. At least one of the members is connected to a closure member for engaging the elevated structure. As the bracket is moved towards the elevated structure, the closure member engages the elevated structure and at least partially closes the bracket to permit the fastener to engage the first and second members. When the bracket is open, the closure member preferably extends interiorly of the bracket below an upper surface of the upper member to permit the closure member to engage the elevated structure and thereby close the bracket.

In one bracket configuration, the closure member is connected only to a bottom member and not to the upper member. Stated another way, the closure member is discrete from the upper member. This configuration permits the closure member to move the bottom member independently of the upper member.

The fastener can be any suitable fastening device, with a threaded bolt being most preferred.

The bracket is relatively simple to operate. Mounting of the bracket on the utility structure includes the following steps:

(a) opening the bracket;

(b) moving a member of the opened bracket towards a structural member of the elevated structure;

(c) engaging the closure member, which is commonly connected to the other member of the opened bracket, with the structural member to at least partially close the opposing distal ends of the opened bracket; and (d) fastening the distal ends of the two members after the closure member is engaged with the structural member.

The bracket has a number of benefits particularly in utility applications. The bracket is relatively lightweight and simple to use and install. It can be mounted on a structural member of a power pole, telephone pole, and the like in a matter of minutes using a hotstick. Because the bracket is readily employable using a hotstick, power can be transmitted by the lines during employment of the bracket. The bracket can be relatively inexpensive and easy to manufacture due to its relatively simple design.

Another aspect of the present invention provides a perch guard that is readily mounted on a utility structure using the bracket. As will be appreciated, a perch guard limits the wingspan of a bird standing on the elevated structure. The perch guard preferably includes a plurality of tubular members that are composed of a UV-resistant, weather-resistant (e.g., non-corrosive), lightweight, and electrically insulative material. Preferably, the material is selected from the group consisting of polyvinyl chloride, fiberglass, wood, polypropylene and all forms and types of plastics and composites thereof. The perch guard can have a relatively long service life due to the use of such materials and be relatively inexpensive. Because the guard can be manufactured from plastics instead of fiberglass, it can be nonsplintering during installation.

DETAILED DESCRIPTION

Figure 1:
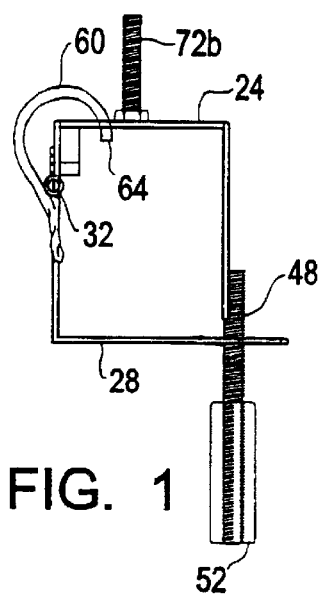
FIG. 1 is a front view of an embodiment of a bracket according to the present invention.
Figure 2:
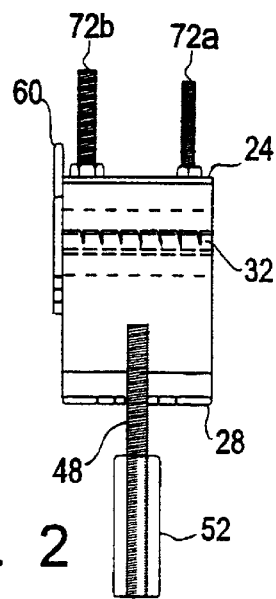
FIG. 2 is a right side view taken from another side of the bracket of FIG. 1.
Figure 3:
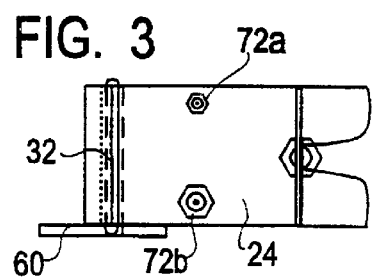
FIG. 3 is a upper view of the bracket of FIG. 1.
Figure 6:
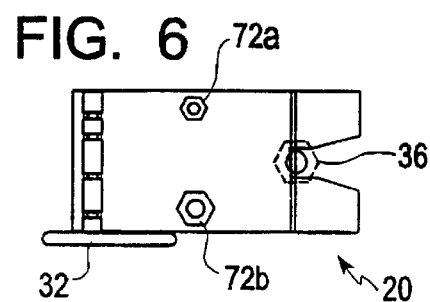
FIG. 6 is another upper view of the bracket of FIG. 1.
Figure 4:
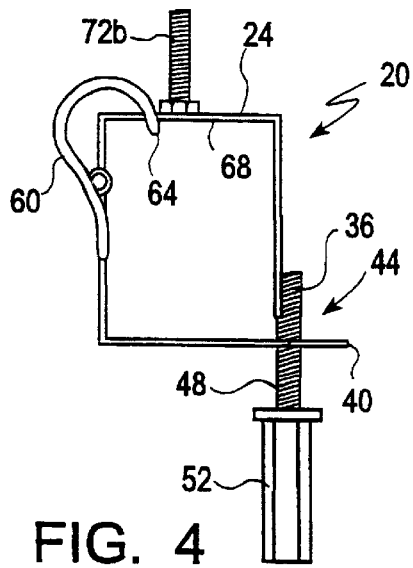
FIG. 4 is another front view of the bracket of FIG. 1.
Figure 5:
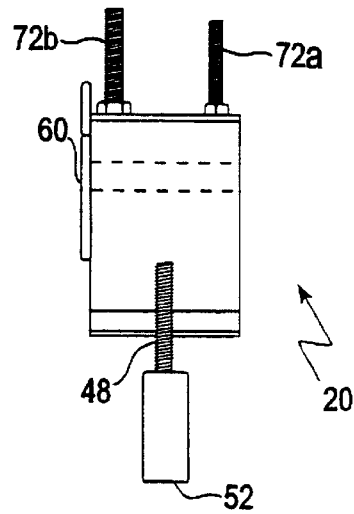
FIG. 5 is another right side view of the bracket of FIG. 1.
Figure 7:
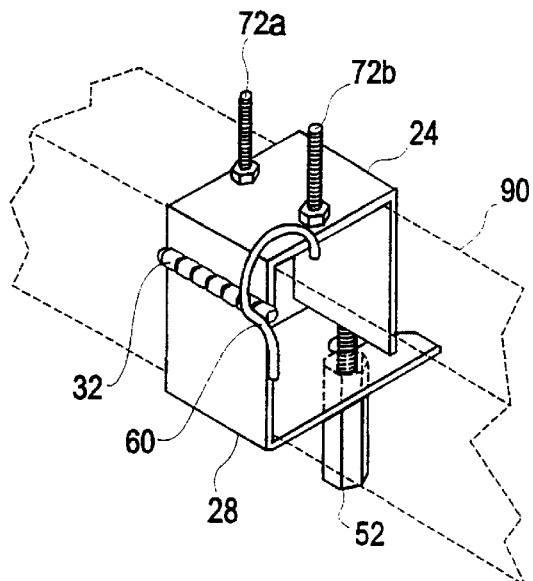
FIG. 7 is a view of the bracket of FIG. 1 when engaged with a structural member of a utility structure.
Figure 9:
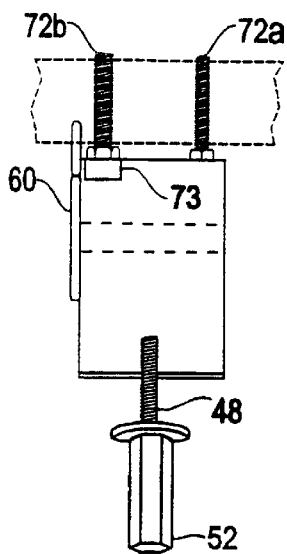
FIG. 9 is a right side view of the bracket of FIG. 8.

A first embodiment of a self-closing bracket according to a first aspect of the present invention is depicted in FIGS. 1–7. The bracket 20 includes an upper member 24 and a lower member 28 connected by a hinge 32. The upper and lower members 24 and 28 rotate about the hinge 32 to permit the distal ends 36 and 40 to open and close. As will be appreciated, the hinge 32 can be replaced by any suitable attachment device. In this manner, the bracket can be clamped about an object, such as a cross-arm on a utility pole. The bracket is preferably composed of a UV-resistant, lightweight, and weather-resistant material such as stainless steel, poly(vinyl chloride), galvanized metals, all forms and types of plastics and the like.

A fastener 44 includes a threaded member 48 connected to the upper member 24, such as by welding, and a rotatable threaded nut 52 that screws onto the threaded member 48. As will be appreciated, the fastener can be any suitable fastening system, including a clip, cam latch, hood latch, over center latch and the like.

The lower member 28 is slotted to permit the threaded member 48 to pass through the slot 56. The width of the slot 56 is larger than the width of the threaded member 48 but less than the width of the nut 52 to permit the nut 52 to engage the lower member 28.

The process for opening and closing the bracket is relatively straightforward. By screwing the nut upwardly relative to the threaded member, the nut engages the lower member and moves the distal end of the lower member closer to the distal end of the upper member. Conversely, by screwing the nut downwardly relative to the threaded member, the nut moves away from the upper member and thereby lowers the distal end of the lower member away from the distal end of the upper member.

The bracket further includes a closure member 60 attached to the lower member 28 and preferably not to the upper member 24. The tip 64 of the closure member 60 extends below the upper surface 68 of the upper member 24 when the bracket is open. In other words, the closure member 60 is located interiorly of the longitudinal axis of the hinge while a lower portion of the lower member 28 is located exteriorly of the longitudinal axis of the hinge. The closure member 60 engages the structural member during positioning of the bracket over the structural member and moves the distal end of the lower member 28 closer to the distal end of the upper member 24, thereby causing the slotted portion of the lower member 28 to receive the threaded member 48 so that the nut 52 can move the lower member into a closed position. Stated another way, the structural member contacts the closure member and as the upper member of the bracket moves closer to the upper surface of the structural member the closure member (and lower member) is rotated into a more vertical orientation, with the tip of the closure member being closer to the upper member. After rotation and full engagement of the bracket with the structural member, the plane of the closure member is substantially aligned with (substantially parallel to) the adjacent portions of the upper member.

Figure 14:
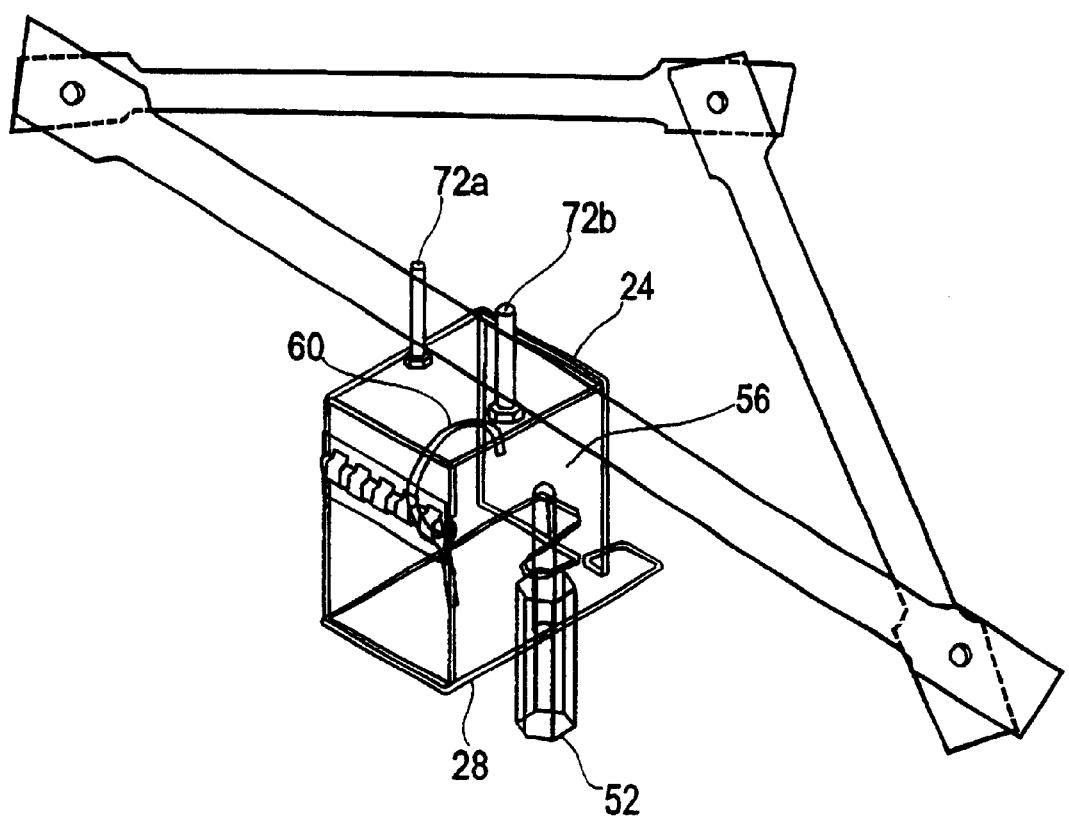
FIGS. 14 and 15 depict the bracket of FIG. 1 engaged with a perch guard.

The bracket can further include devices, such as screws 72a,b for mounting objects, such as a perch guard, on the bracket. As explained in detail below, FIG. 14 depicts the bracket engaging a plurality of members defining a perch guard.

Another embodiment of a bracket according to the present invention is depicted in FIGS. 8–13. The bracket 100 is the same as the bracket 20 except that the interior surfaces of the upper and lower members 102 and 103 are shaped differently to accommodate a structural member 104 that has a different shape than the structural member 90 of FIG. 7 and the bracket 100 includes a projection 73 that is received in a suitably sized and shaped recess or hole (not shown) in the structural member to provide lateral stability (i.e., inhibit slipping and sliding) of the bracket on the structural member. As will be appreciated, the shape of the interior surface commonly has the same shape as the exterior surface of the structural member.

Figure 8:
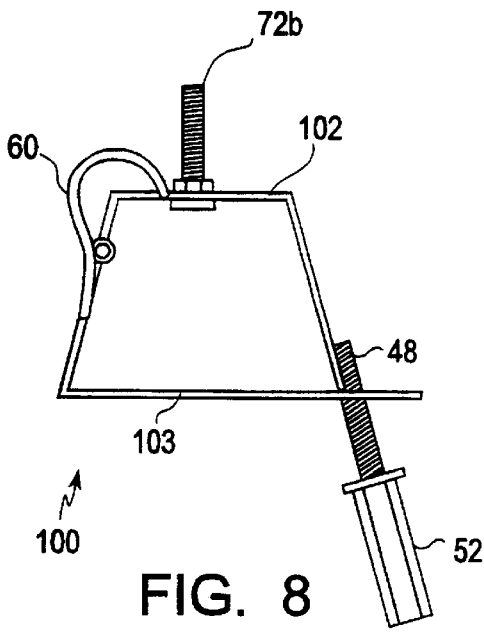
FIG. 8 is a front view of a bracket according to another embodiment of the present invention.
Figure 10:
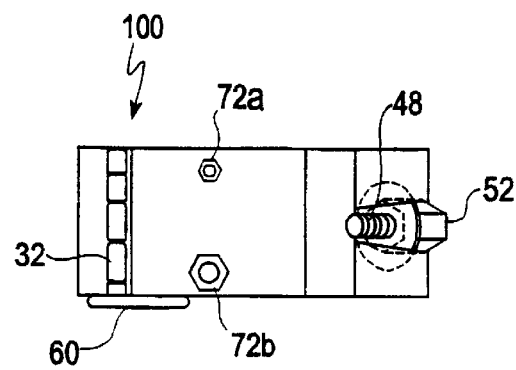
FIG. 10 is a upper view of the bracket of FIG. 8.
Figure 11:
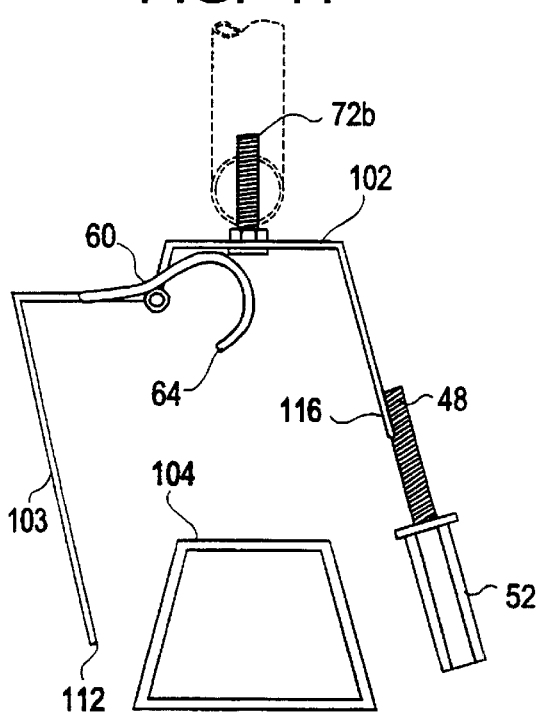
FIG. 11 depicts the bracket of FIG. 8 in an open position, before engagement with a structural member.
Figure 12:
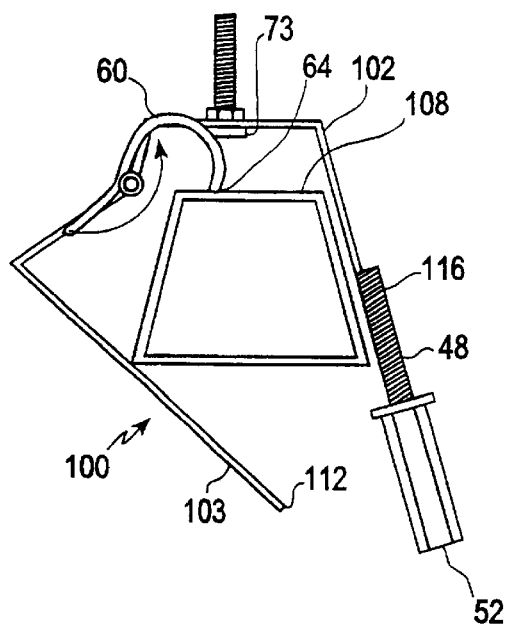
FIG. 12 depicts the bracket of FIG. 8 during engagement with the structural member.
Figure 13:
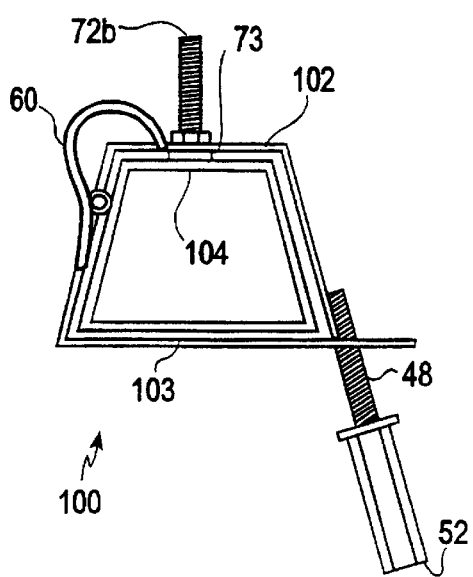
FIG. 13 depicts the bracket of FIG. 8 after engagement with the structural member.
Figure 16:
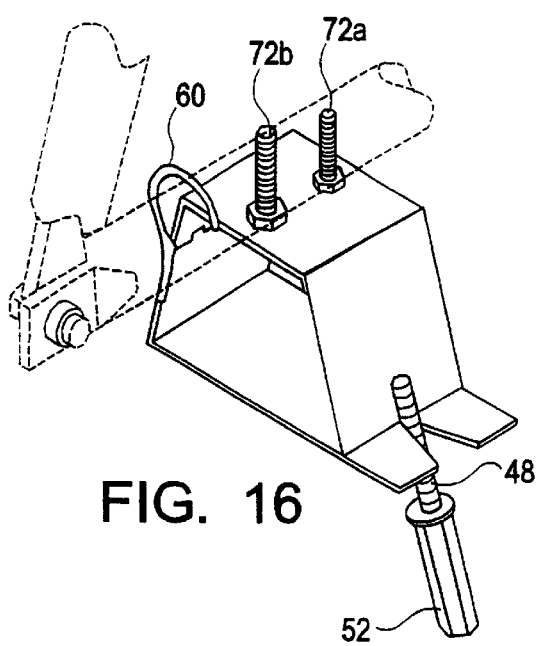
FIG. 16 depicts the bracket of FIG. 8 engaged with a perch guard.

The operation of the bracket is relatively straightforward. As shown in FIGS. 11–13, the bracket 100 is opened and placed over the structural member 104 (FIG. 11) typically using a hotstick. As the bracket 100 engages the structural member 104, the tip 64 of the closure member 60 engages the upper surface 108 of the structural member 104 and causes the distal ends 112 and 116 of the bracket to move (e.g., rotate) towards one another. The distances between the distal ends and between the closure member and hinged rear surface of the upper member progressively decrease as the upper surface of the bracket 100 moves closer to the upper surface of the structural member 104 (FIG. 8). When the bracket is resting on upper of the structural member 104, the closure member 60 has caused the distal ends 112 and 116 to move close enough together for the threaded member 48 to be received in the slot 56 of the slotted portion (FIG. 13). The nut can then be moved clockwise (or tightened) using the hotstick to force the lower member 103 and upper member 102 of the bracket against the structural member 104.

The bracket is operated easily by a hotstick. Accordingly, the transmission of power by the wires supported by the structural member does not need to be interrupted during installation of the bracket on the utility structure.

FIGS. 15–20 depict a perch guard 200 according to a second aspect of the present invention. In FIGS. 17–20, the perch guard is depicted without the bracket of the previous aspect of the invention. As can be seen from FIG. 17, the interconnected tubular members 204a prevent a bird from extending its wingspan to contact adjacent insulators 208a,b. In this manner, the bird is not electrocuted. The tubular members are composed preferably of a UV-resistant and weather-resistant material, such as poly(vinyl chloride), fiberglass, wood, polypropylene, all forms and types of plastics and the like.

Figure 15:
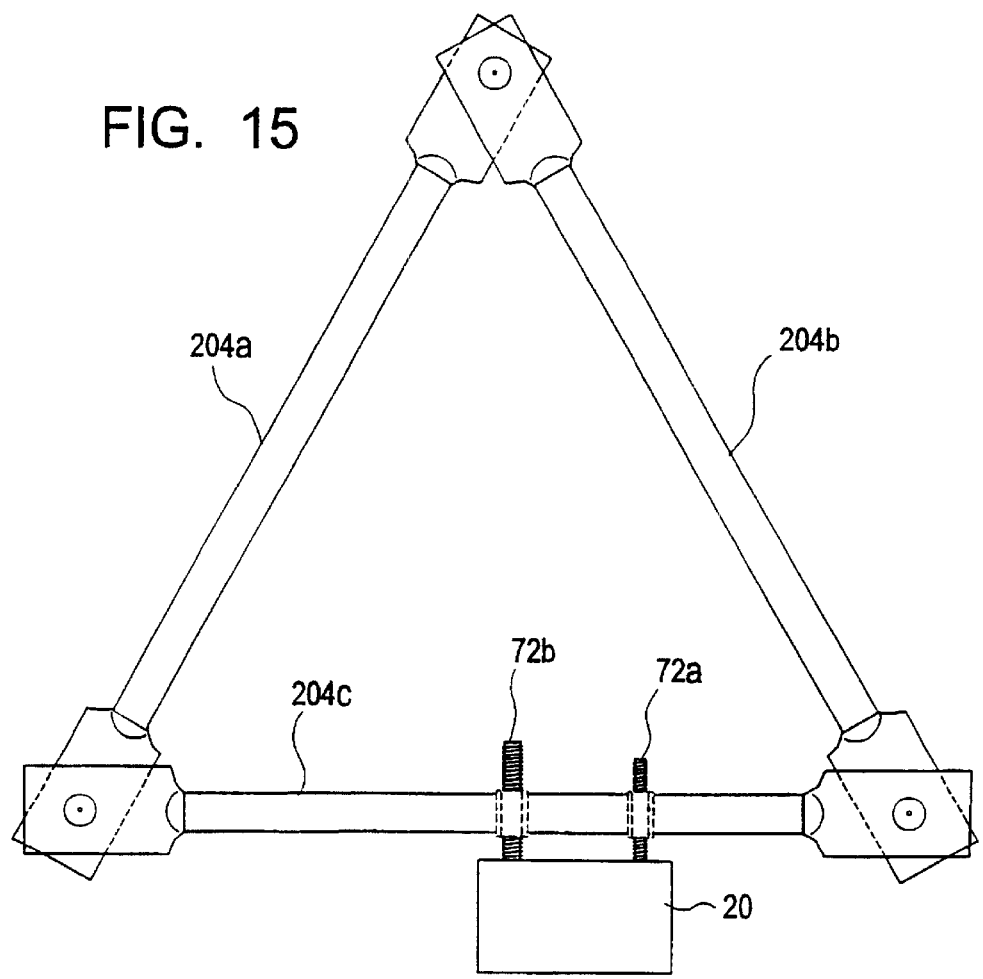
Figure 17:
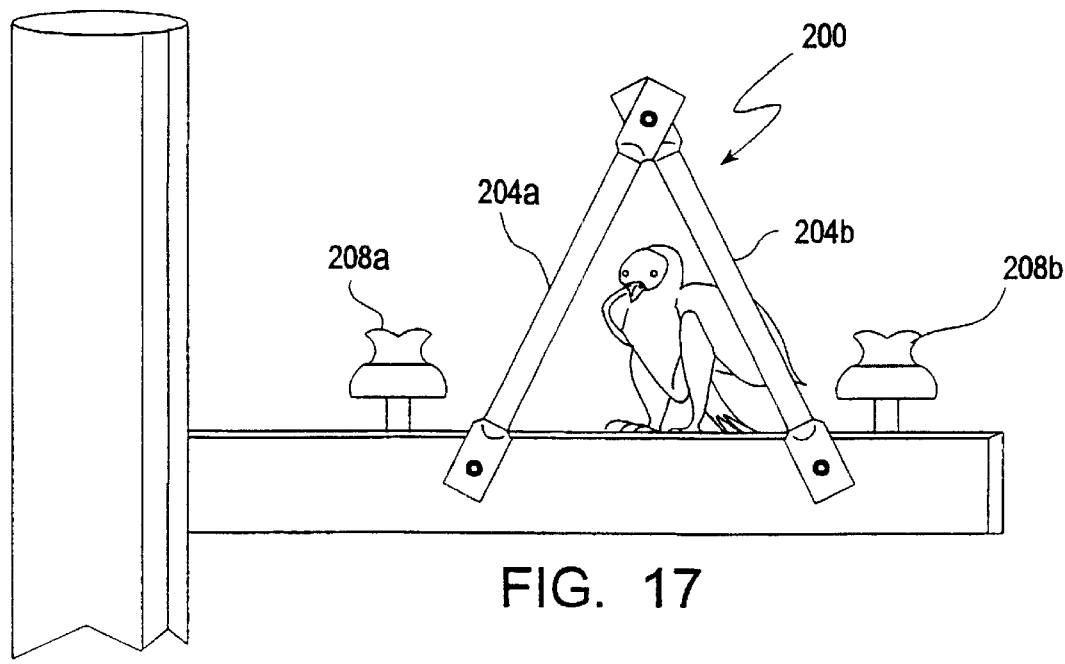
FIGS. 17 and 18 depict differing configurations of perch guards according to the present invention.
Figure 18:
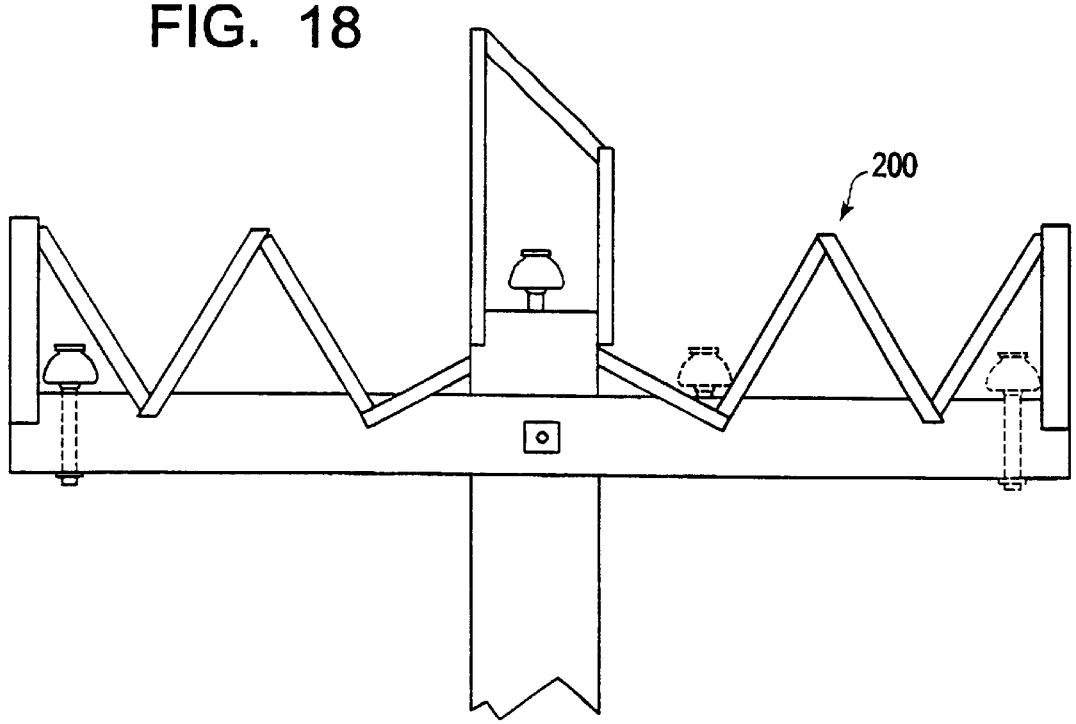
Figure 19:
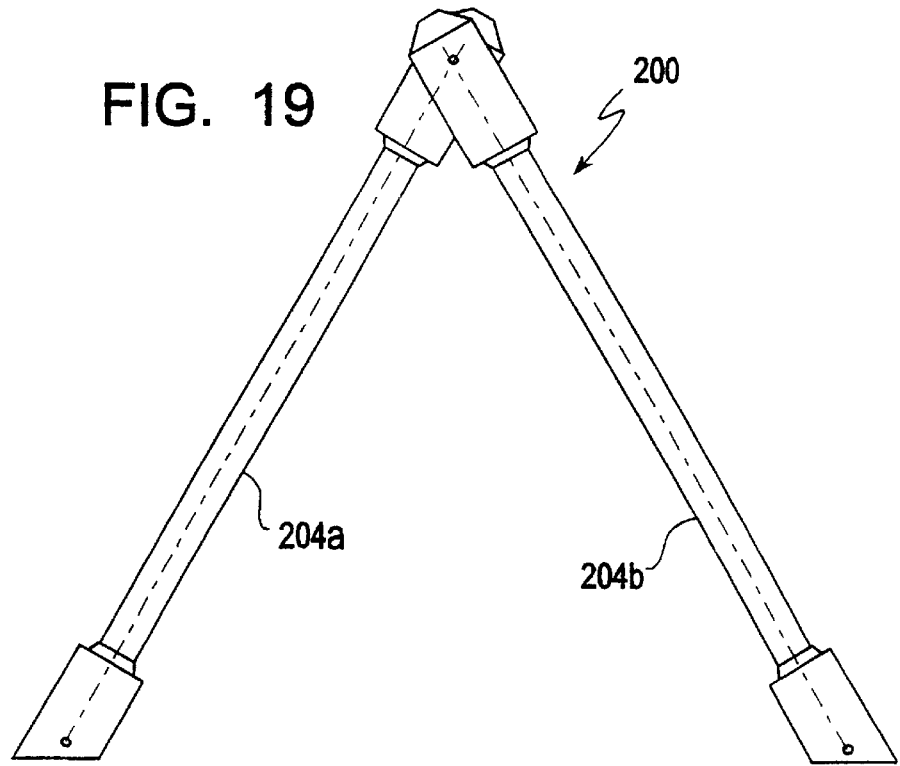
FIG. 19 depicts tubular members of a perch guard.

FIGS. 14 and 15 depict a number of interconnected tubular members 204a–c mounted on the bracket 20 of the first aspect of the invention. The bolts 72a and 72b penetrate (pass through) the lower member of the perch guard and hold it in position. As will be appreciated, any suitable attachment device may be used to attach the perch guard to the bracket, such as a clamp, and the like.

Figure 21:
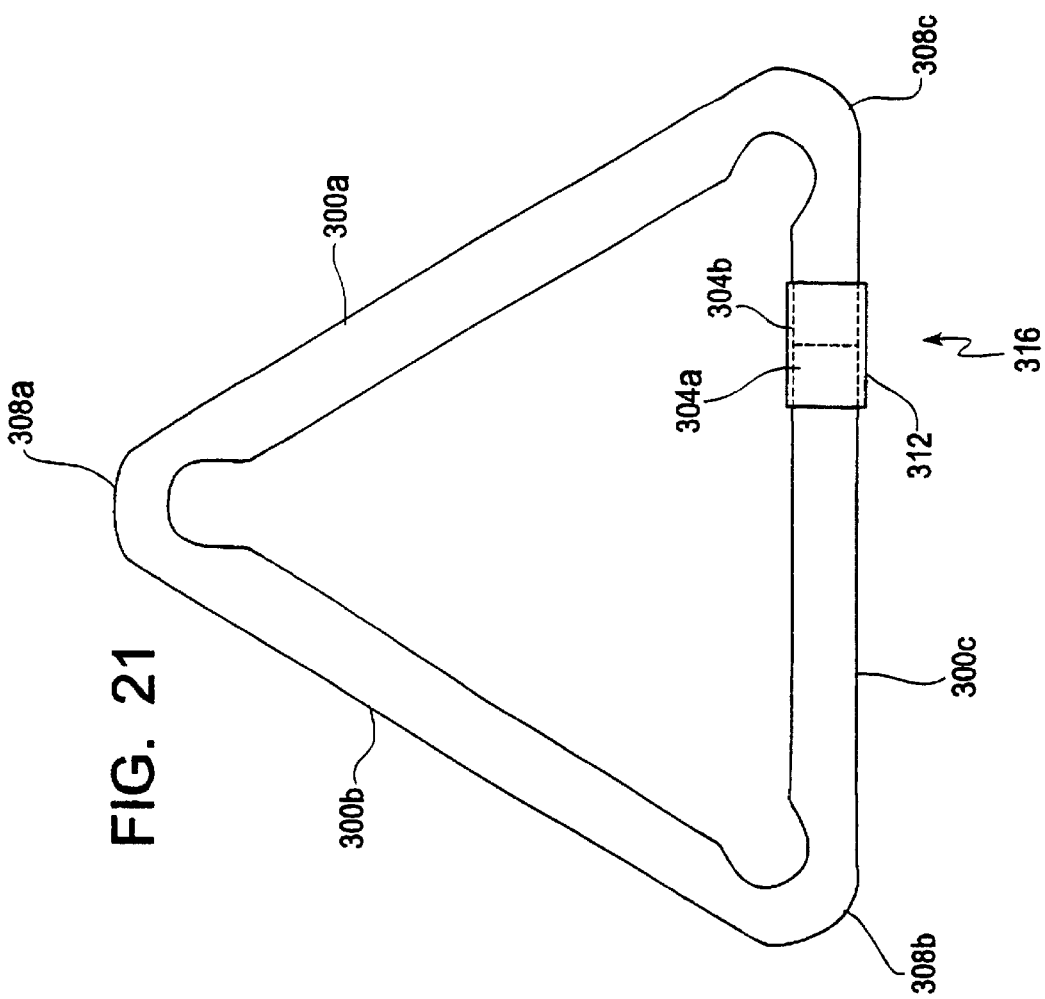
FIG. 21 depicts another perch guard configuration.
Figure 20:
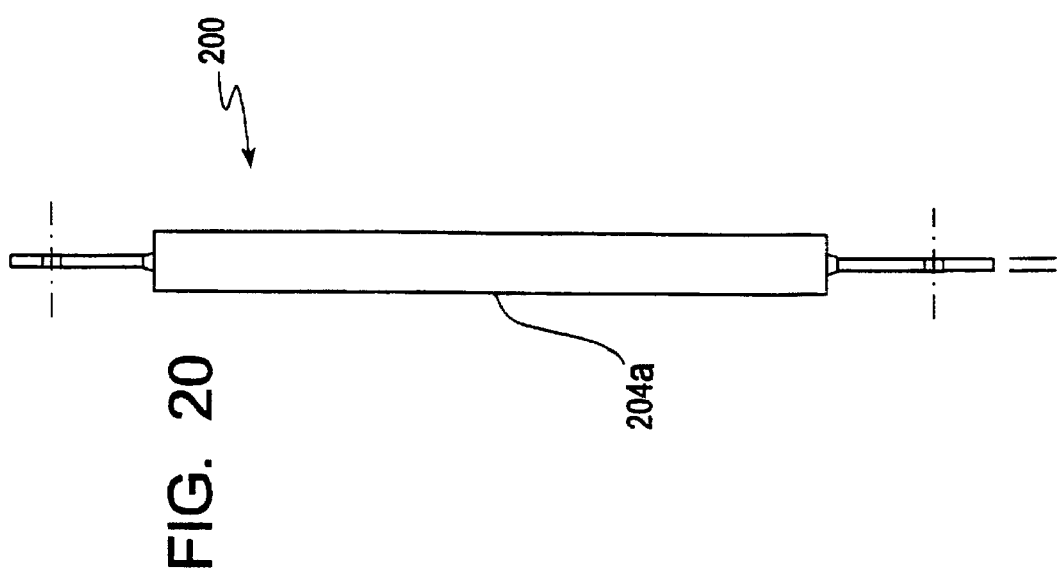
FIG. 20 depicts the side view of a tubular member.

FIG. 21 depicts another perch guard configuration. The members 300a–c are formed by a continuous length of tubular member formed preferably from a plastic such as polylvinyl chloride) that has been deformed into a series of bends 308a–c and straight sections to define a triangle. The free ends 304a,b of the perch guard 316 are preferably connected with cement via a tubular coupling 312 that telescopically receives the free ends 304a,b.

Another embodiment of a bracket for mounting a perch guard is depicted in FIGS. 22–26. The bracket 200 includes a hinged upper member 204 and a hinged lower member 208 connected by the hinge pin 212. The closure member 218 on the inside of the lower member 208 has the same function of engaging the crossarm as the closure member 60 noted above to facilitate closing of the bracket about the crossarm. The backside 222 of the closure member 218 is in a nested relationship with the recessed member 226 on the upper member 204 to permit the lower member 208 to close fully when an object such as a crossarm is received in the bracket 200. When the bracket closes, the backside 222 of the lower member is received in the recessed member 226. The upper surface 230 of the upper member 204 includes two interconnected passages 234a,b which engage the ends of a perch guard. For structural support, the lower member 208 includes a plurality of gussets 246. As can be seen from FIG. 24, the gussets on the backside 222 of the closure member 218 are received in similarly shaped recesses on the recessed member 226. The bracket 200 can be fabricated from any suitable material with UV-resistant plastic being more preferred for reasons of cost. The perch guard can also be fabricated from any suitable material with UV resistant electrical conduit being more preferred.

Figure 22:
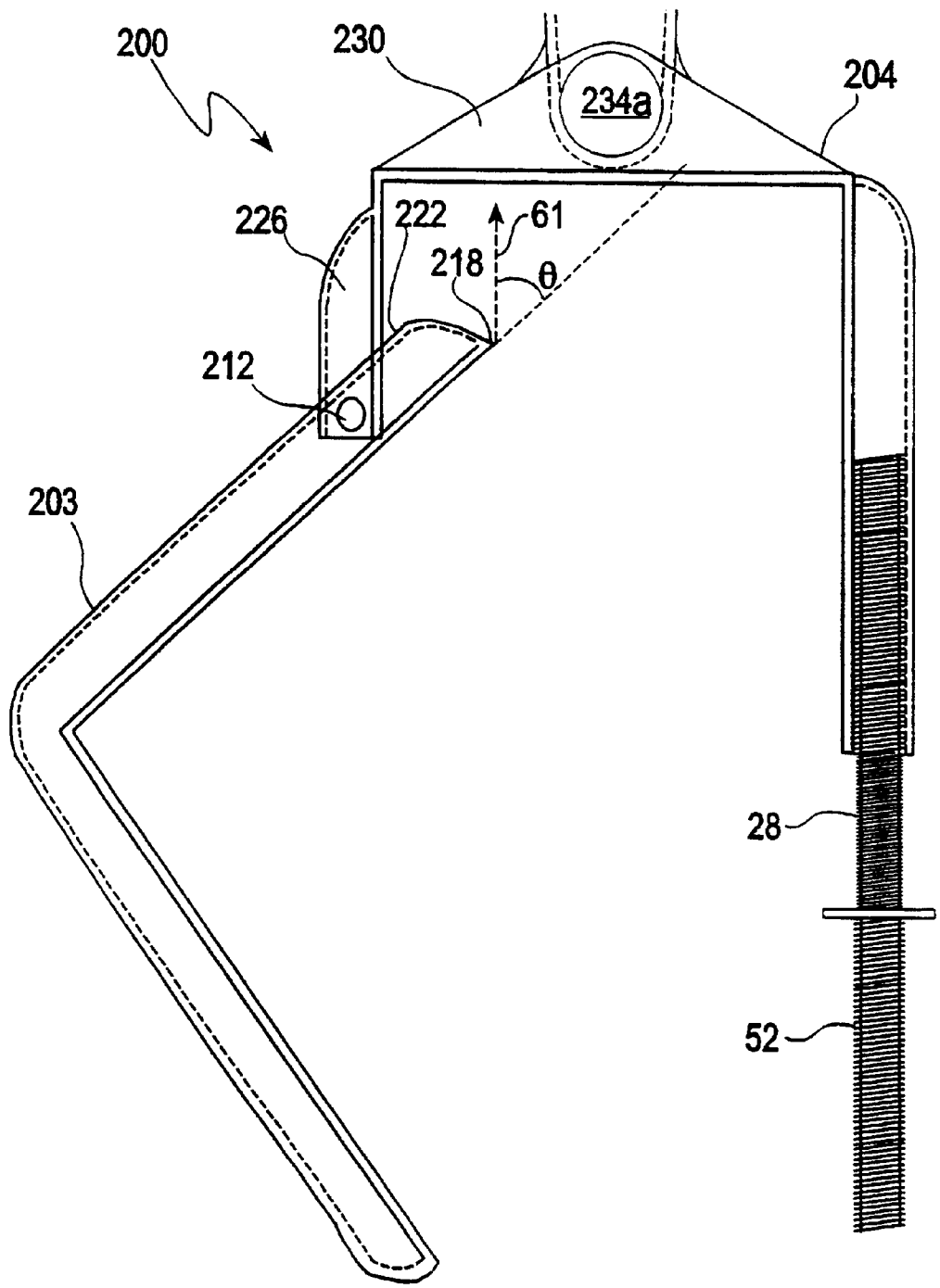
FIG. 22 is a side view of another embodiment of a bracket according to the present invention.
Figure 23:
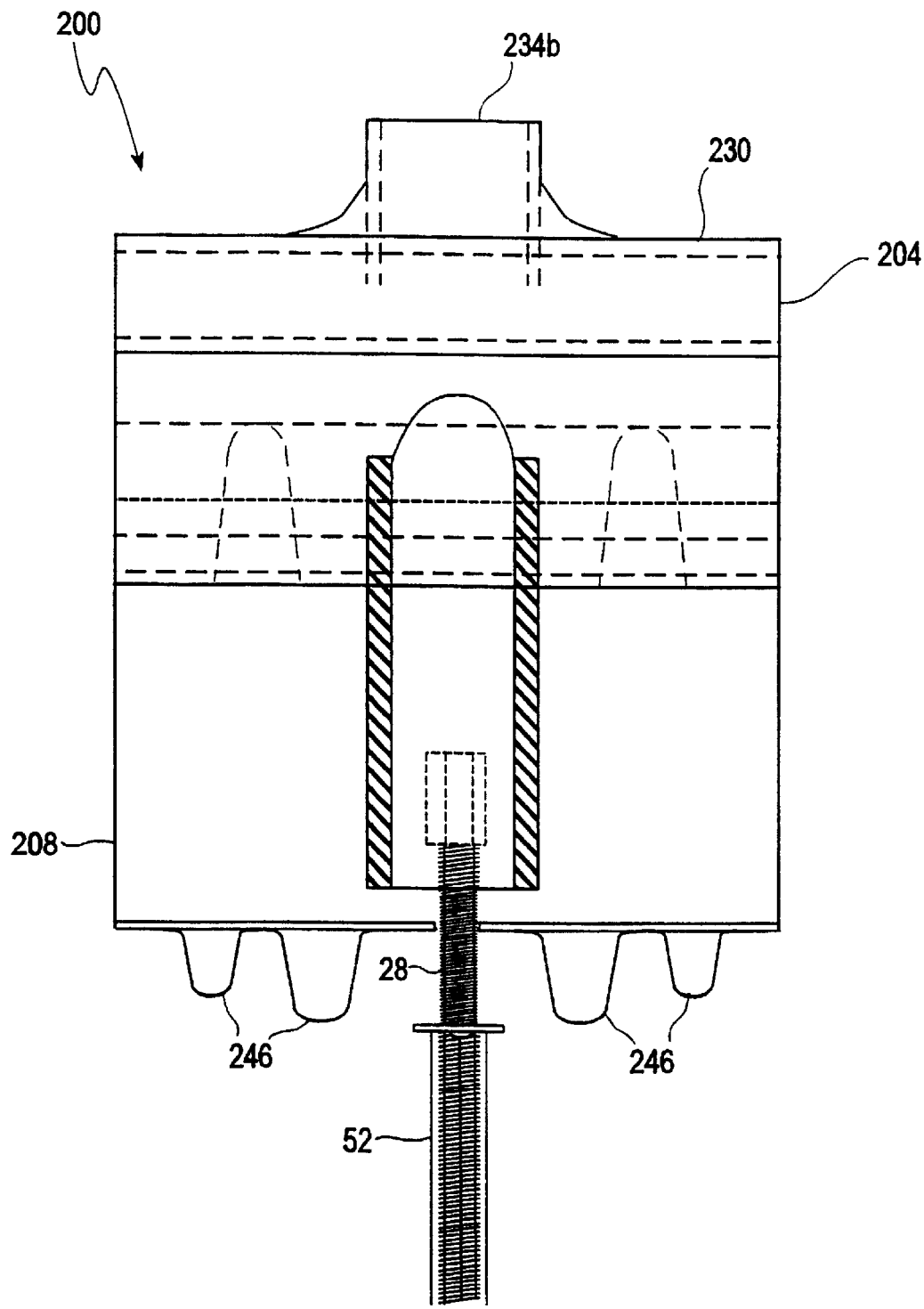
FIG. 23 is a front view of the bracket of FIG. 22.
Figure 24:
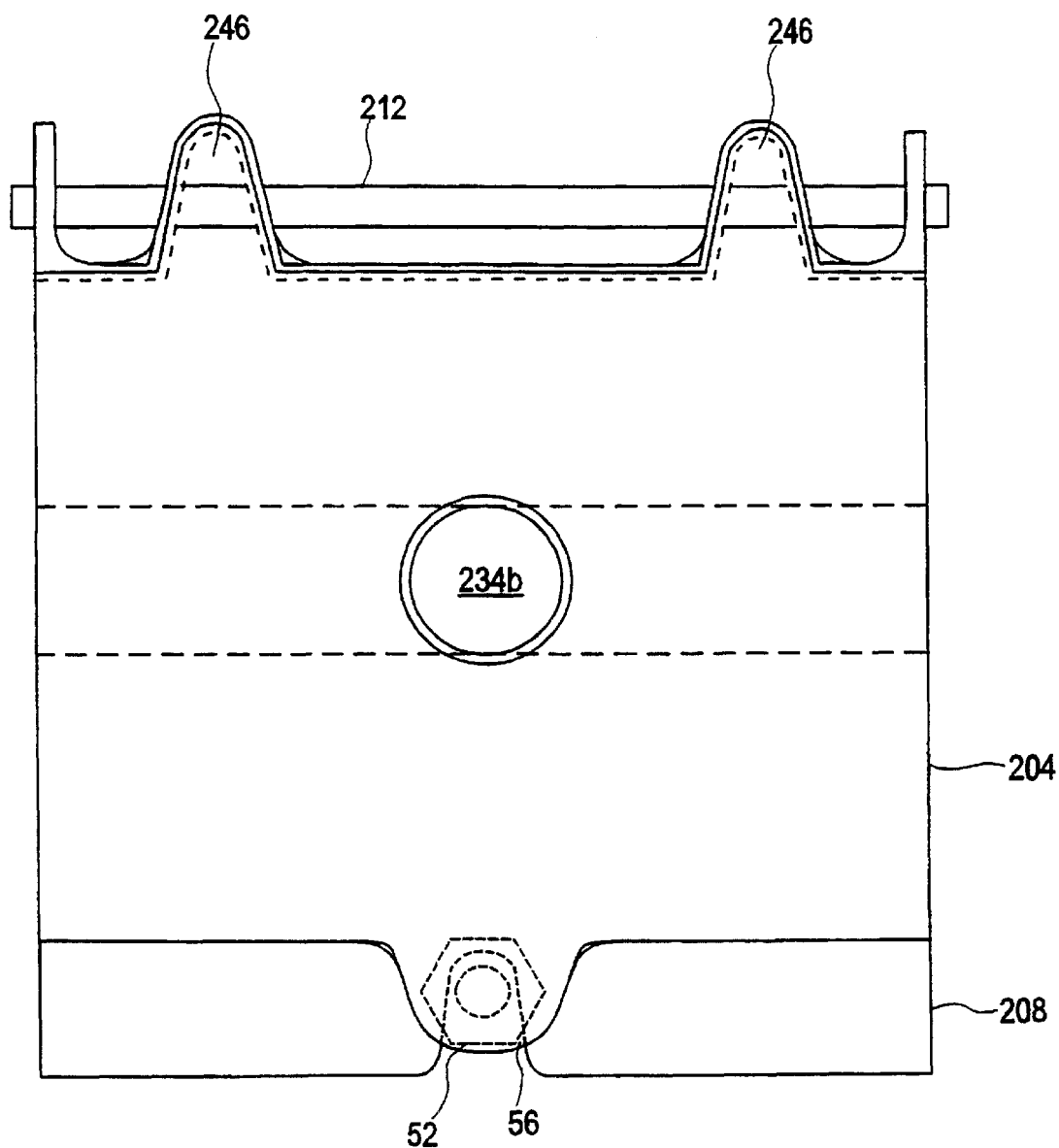
FIG. 24 is a upper view of the bracket of FIG. 22.
Figure 25:
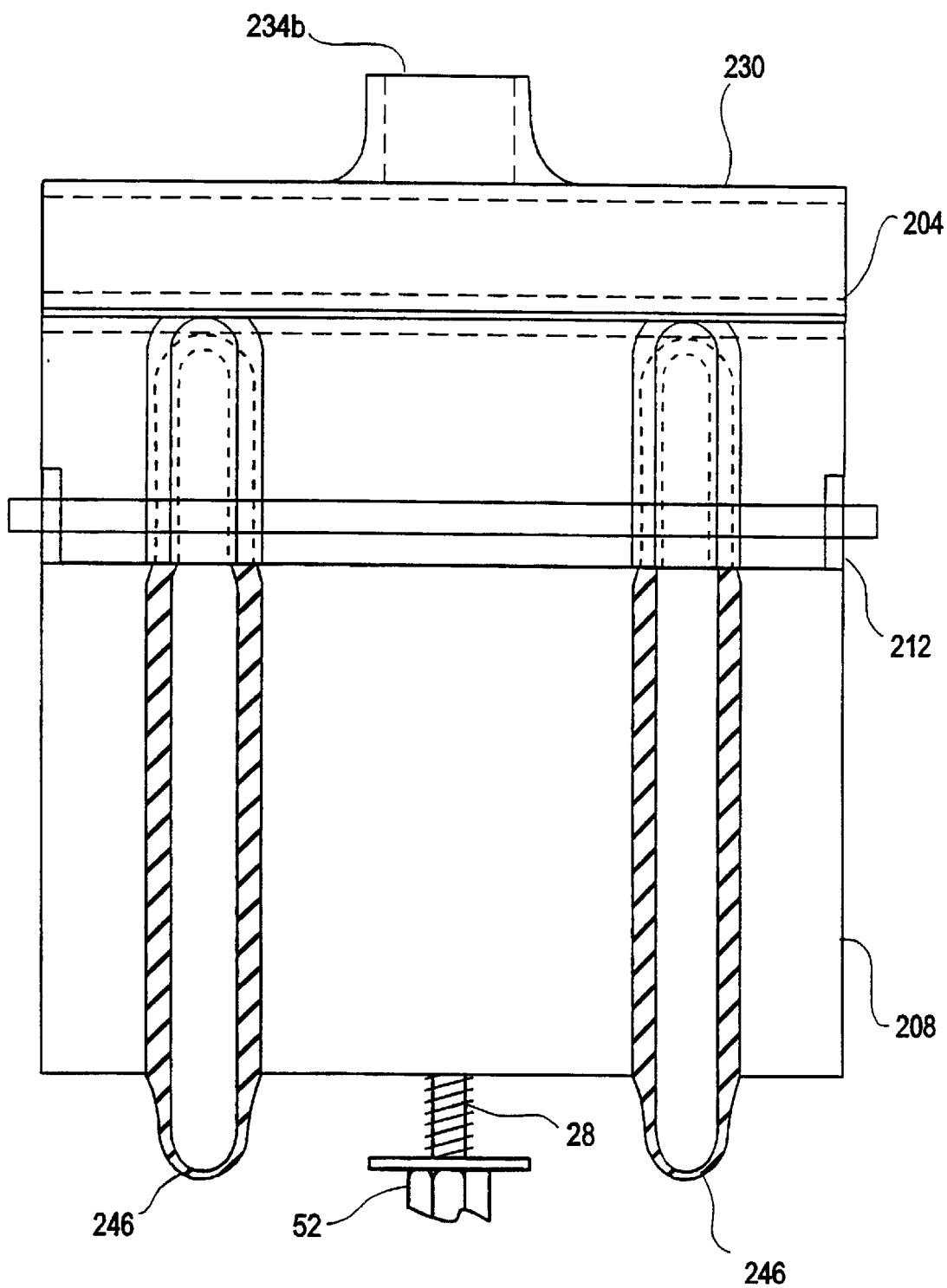
FIG. 25 is a rear view of the bracket of FIG. 22.
Figure 26:
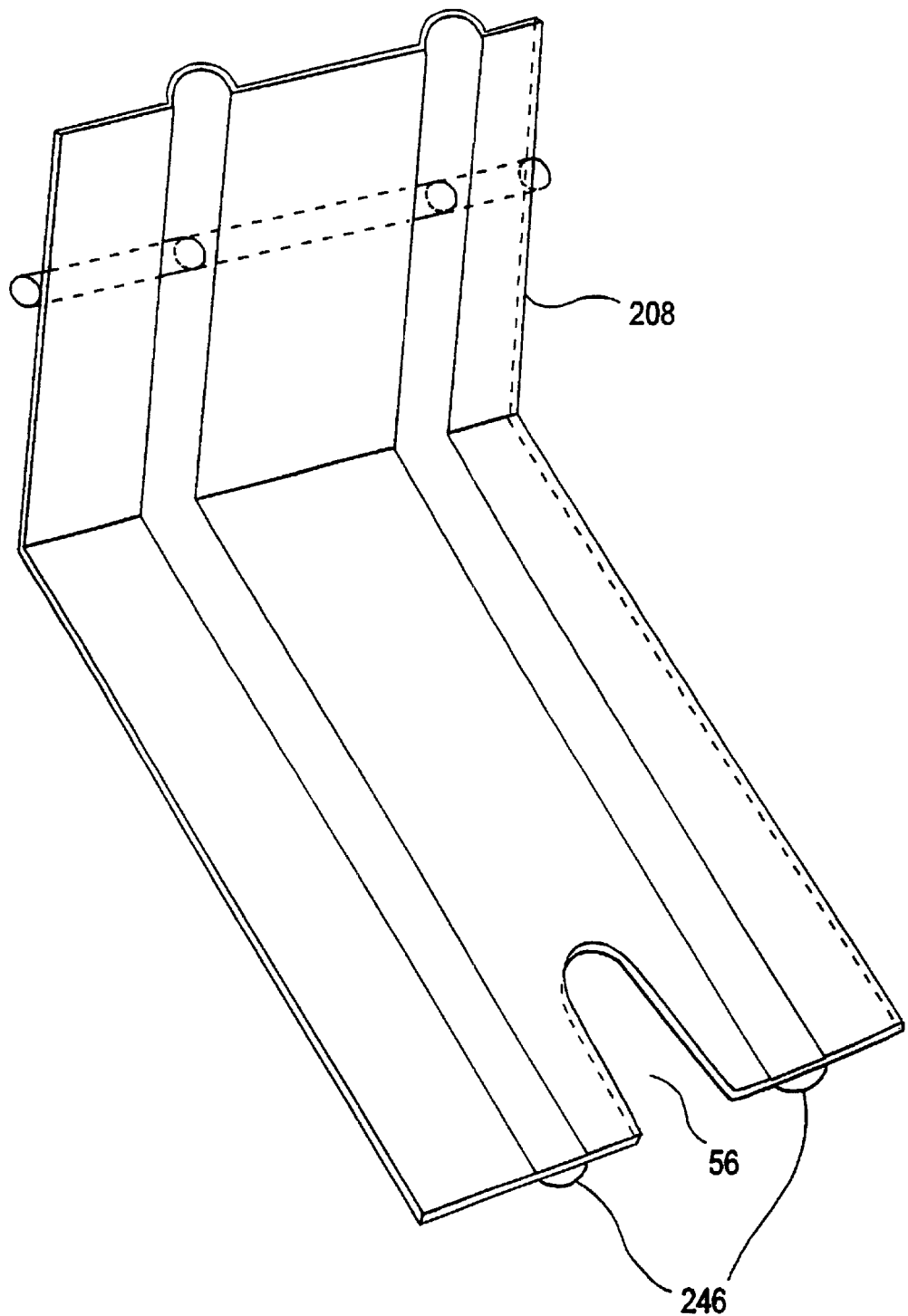
FIG. 26 is a view of the detached lower hinged member of the bracket of FIG. 22.
Figure 27:
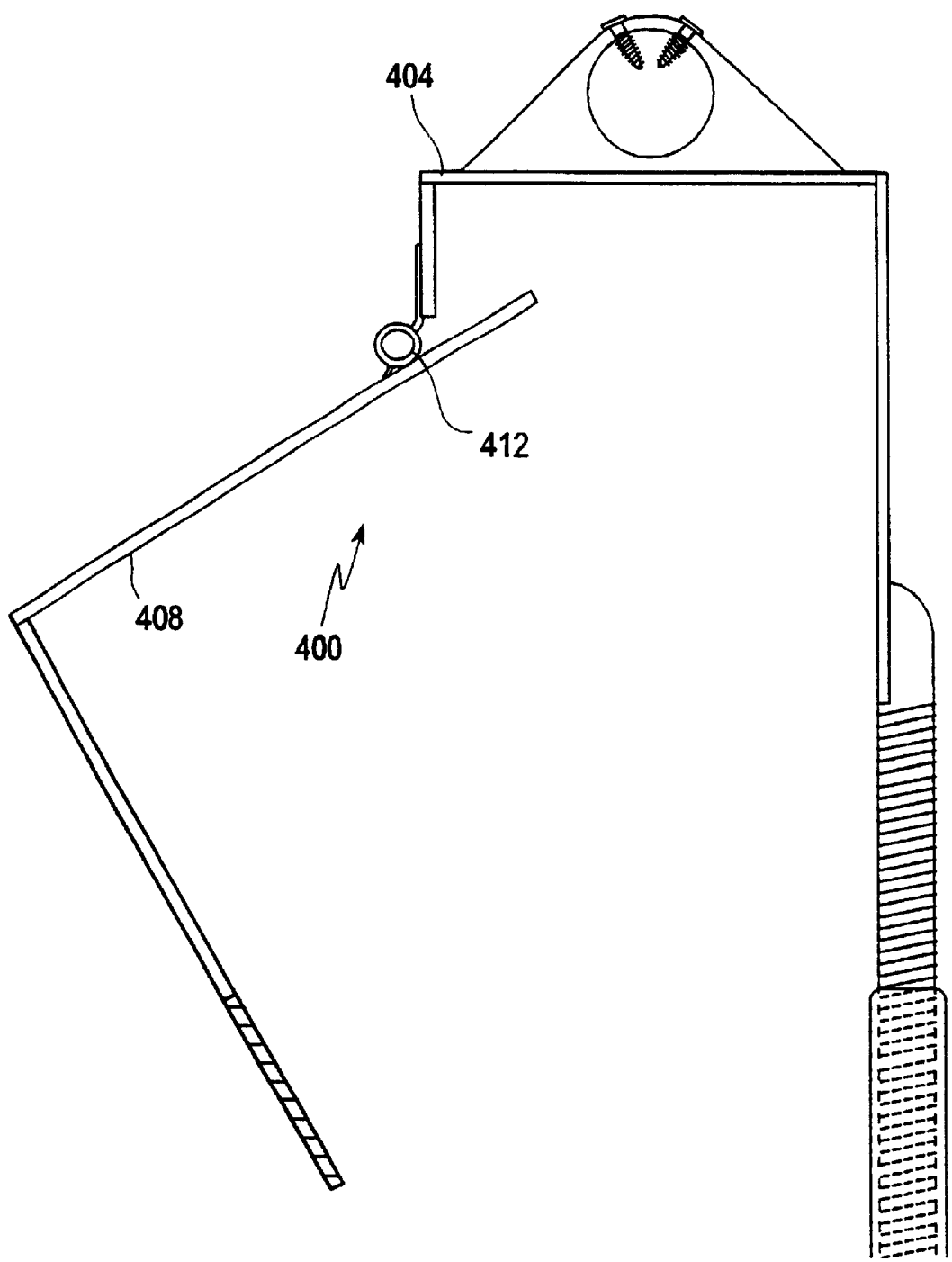
FIGS. 27–28 are side and front views respectively of another embodiment of a bracket.
Figure 28:
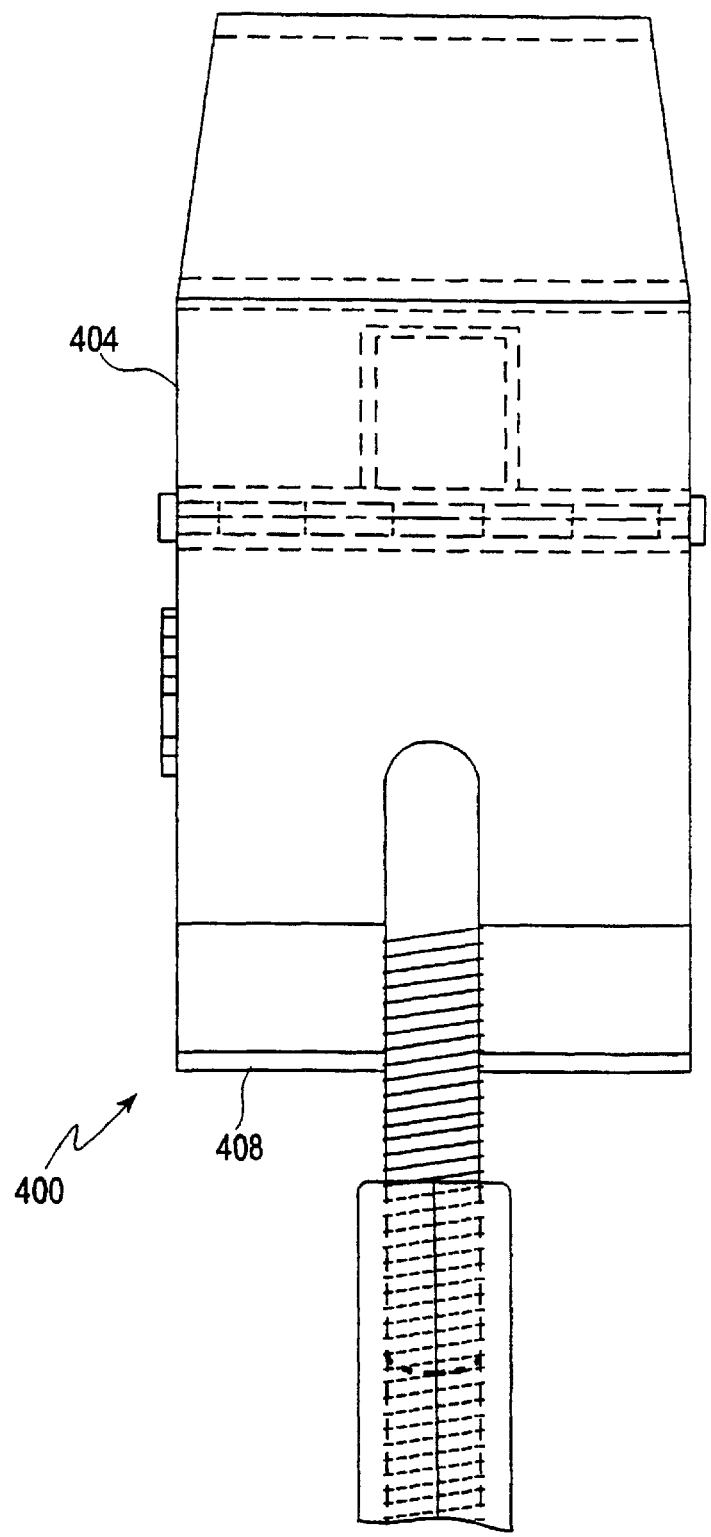
Figure 29A:
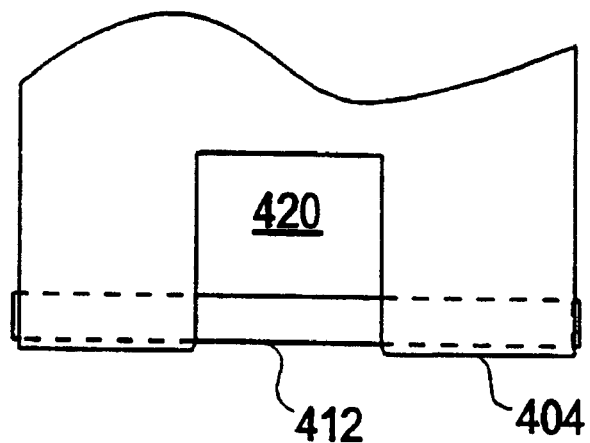
FIG. 29A is rear view of the upper member of the bracket.
Figure 29B:
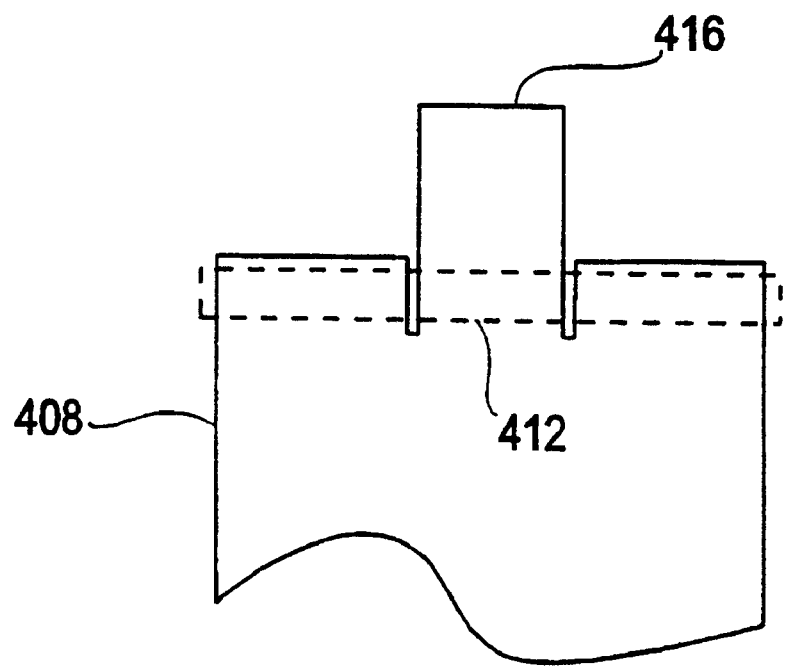
FIG. 29B is a rear view of the lower member of the bracket.

Referring to FIG. 22, when the bracket is opened (and before the closure member is engaged with the structural member), the closure member 60 forms a first angle ⊖ with the vertical axis 61 and, when the bracket is engaged with the structural member, the closure member forms a second angle ⊖ (not shown) with the vertical axis 61. The first angle is more than the second angle.

Yet another embodiment of a bracket is depicted in FIGS. 27–28 and 29A and 29B. The bracket 400 has upper and lower members 404, 408 connected by a hinge member 412. The lower member 408 has a closure member 416 that extends upwardly above the hinge member 412 and is received in a slot 420 in the upper member 404 when the bracket is fully closed. In all other respects the operation of the bracket is substantially the same as the brackets described above.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A bracket for mounting on an elevated structure supporting a line for transmitting electrical energy, comprising:
    an upper member and a bottom member connected by a hinge member and a fastener for engaging the upper and bottom members, the upper and bottom members being axially aligned when the bracket is open, wherein at least one of the upper and bottom members is connected to a closure member for engaging the elevated structure such that, when the bracket is moved towards the elevated structure, the closure member engages the elevated structure and at least partially closes the bracket to permit the fastener to engage the other of the at least one of the upper and bottom members.

2. The bracket of claim 1, wherein, when the bracket is open, the closure member extends below an upper surface of the upper member.

3. The bracket of claim 1, wherein the closure member is connected to the bottom member and is positioned in a central portion of the at least one of the upper and bottom members.

4. The bracket of claim 1, wherein the closure member is discrete from the upper member and is in nested relationship with the upper member when the bracket is closed.

5. The bracket of claim 1, wherein the fastener is attached to the bottom member and received in a slot in the upper member.

6. The bracket of claim 1, wherein the bracket is connected to device for limiting a wingspan of a bird standing on the elevated structure, the device for limiting a wingspan including a plurality of tubular members.

7. The bracket of claim 6, wherein the closure member is part of the bottom member and engages the upper member after closure of the bracket.

8. The bracket of claim 7, wherein the axial alignment of the bottom and upper members is the same whether the bracket is in the open position or the closed position.

9. The bracket of claim 1, wherein a rear surface of the upper member is adjacent and connected to the hinge member and wherein in a first mode the bracket is open and in a second mode the bracket is closed and wherein in the first mode a free end of the closure member and the rear surface of the upper member are separated by a first distance and in the second mode the free end of the closure member and the rear surface of the upper member are separated by a second distance and the first distance is more than the second distance.

10. The bracket of claim 1, wherein, when the bracket is closed, a plane defined by a front or rear surface of the closure member is substantially parallel to a plane defined by a front or rear surface of an adjacent portion of the upper member.

11. The bracket of claim 1, wherein, when the bracket is open, the closure member forms a first angle relative to the vertical and when the bracket is closed the closure member forms a second angle relative to the vertical and wherein the first angle is more than the second angle.

12. The bracket of claim 1, wherein the closure member and a lower portion of the lower member are located on opposing sides of the hinge member.

13. A bracket for mounting on an elevated structure supporting a line for transmitting electrical energy, comprising:

opposing first and second members rotatably connected by a hinge;

a closure member engaging at least one of the first and second members; and a fastener for engaging the first and second members, and moving each of the first and second members closer to a member of the elevated structure, the fastener and hinge being located on opposing sides of the bracket, wherein, when the bracket is moved towards the member of the elevated structure to be engaged by the bracket, the closure member engages the member and at least partially closes a space between free ends of the first and second members to permit the fastener to engage the other of the at least one of the first and second members.

14. The bracket of claim 13, wherein, when the bracket is open, the closure member extends into the interior of the bracket and the first and second members are axially aligned.

15. The bracket of claim 14, wherein, when the bracket is closed, the closure member is in a nested relationship with at least one of the first and second members.

16. A method for mounting a bracket on an elevated structure supporting a line for transmitting electrical energy, comprising:

moving a first member of an opened bracket towards a structural member of the elevated structure, wherein the first member and a second member have substantially the same orientation relative to one another whether the bracket is opened or closed;

engaging a closure member with the structural member to at least partially close the opened bracket by moving the first member and second member closer together; and fastening the first member to the second member after the closure member is engaged with the structural member.

17. The method of claim 16, wherein electrical energy is passing through the line during each of the recited steps.

18. The method of claim 16, wherein the closure member is connected to the second member of the opened bracket and the first member and second member are aligned axially.

19. The method of claim 16, wherein the first member and the second member are rotatably interconnected by a hinge member and the first member and second member are in a face-to-face relationship when the bracket is opened and closed.

20. The method of claim 16, wherein the first member and second member are rotatably interconnected but have substantially no lateral movement relative to one another along the axis of rotation.

* * * * *